DYNAMIC PULSE GATING TRANSISTOR CIRCUITRY

Filed Feb. 4, 1955 4 Sheets-Sheet 1

INVENTORS:
Seymour Schoen
Charles A. Krause

By John J. Matlago, Agent
Their Attorneys

INVENTORS:
Seymour Schoen
Charles A. Krause
Carl Beust
Louis A Kline
By John J. Matlago, Agent
Their Attorneys.

INVENTORS:
Seymour Schoen
Charles A. Krause
By Pearl Benst
Louis A Kline
John J. Mallagn, Agent
Their Attorneys.

INVENTORS:
Seymour Schoen
Charles A. Krause
By Earl Benst
Louis A Kline
John T. Matlago, Agent
Their Attorneys United States Patent Office 2,873,384

Patented Feb. 10, 1959

2,873,384

DYNAMIC PULSE GATING TRANSISTOR CIRCUITRY

Seymour Schoen and Charles A. Krause, Los Angeles, Calif., assignors to The National Cash Register Company, Dayton, Ohio, a corporation of Maryland Application February 4, 1955, Serial No. 486,158

11 Claims. (Cl. 307—88.5)

This invention relates to pulse gating circuits and more particularly to a bistable state circuit arrangement utilizing transistor components.

It has been previously shown in the electronic art that digital computing systems can be designed by the use of a memory device in combination with a logical interconnection of a plurality of basic bistable state circuits representative of logical propositions. In such designs these basic circuits are preferably arranged to have a pair of trigger inputs and a pair of outputs. In has further been shown that if all these basic bistable state circuits are available in a standardized "package" arrangement, the problem of designing a particular computer system can be highly simplified inasmuch as the circuit networks for interconnecting the outputs of the bistable state circuits to the trigger inputs thereof can be defined by logical equations using the notation of Boolean algebra.

Such bistable state circuits have been designed in the past with the use of electron tubes, but inasmuch as transistor components dissipate, by far, less power than electron tubes and operate well in conjunction with crystal diode circuits since they themselves are crystal devices, a bistable state circuit utilizing transistor components particularly lends itself for use in such a standardized circuit package.

It is, accordingly, an object of this invention to provide a basic transistor computer circuit, having standardized output and input arrangements, whereby a plurality of these circuits can be interconnected by logical networks so as to function as a desired electronic computing system.

It is a further object of this invention to provide a novel bistable state transistor circuit arrangement which can be selectively triggered to gate a series of pulses representative of either a true output signal or a series of pulses representative of a false output signal.

It is another object of this invention to provide a transistor bistable state circuit arrangement whose outputs are capable of providing sufficient power to drive logical networks.

It is another object of this invention to provide a standardized bistable state transistor circuit arrangement having a true and false output on which signals can be selectively generated by applying trigger signals to a true or false input thereof.

Bistable state circuits have been previously designed to operate in accordance with the "non-return-to-zero" digital techniques, that is, all changes called for in the bistable state circuits of a particular logical system are made precisely at the same instant, i. e., at the end of a basic timing signal period, and a change in state of a bistable state circuit is made only when a change in its output signal is required. Thus the output signals of a bistable state circuit are maintained in a particular state indefinitely, until the circuit is triggered at the end of a timing signal period. This mode of operation has well-known inherent timing and logical advantages, but causes difficulty when high frequency operation is desired and a large amount of power is needed to drive the logical networks.

Bistable state circuits have also been designed to operate in accordance with the "return-to-zero" digital techniques. These latter circuits, known as "dynamic flip-flops," are advantageous in that they permit high frequency operation and enable A.-C. coupled drivers to be employed, thus producing more available power for driving the logical networks. In addition, these latter circuits provide a lower output impedance for the charging of stray capacitance. However, these latter circuits present difficult timing problems inasmuch as they must have a known delay inserted between their input and output circuits in the form of a delay line or similar device. The timing of the signals required to gate the outputs of these dynamic flip-flops to the inputs thereof is then a function not only of these artificial delay lines, but also of the inherent amplifier delays. To operate these dynamic flip-flops, it has thus usually been necessary to generate three or more timing signal sources varying in phase relation and, furthermore, to closely control the width of the waveforms of these timing signals.

The bistable state circuit of the present invention may be considered to be a hybrid combination of the above described circuits in that a single leg transistor flip-flop circuit is provided which operates in the "non-return-to-zero" system, i. e., it maintains an output signal in a particular state indefinitely, changing only when the flip-flop circuit is triggered at the end of a timing signal period. However, the output signals of the bistable state circuit in the present invention are manifested as a series of discrete pulses typical of the "return-to-zero" systems. Thus in the circuits of the present invention, a single leg flip-flop is triggered by the fall of a clock pulse applied on its input, and its output serves to gate the subsequent clock pulses derived from the same timing source onto the output gates, thus automatically providing a delay of one clock pulse period without the use of any external delay devices. This scheme not only eliminates the need of delay devices but also ensures that the delay will be exactly one clock pulse period, thereby precisely controlling the timing of all clock pulses appearing on the outputs.

It is thus another object of this invention to provide a bistable state circuit arrangement which combines the inherent timing and logical advantages of the "non-return-to-zero" digital techniques with the higher frequency and larger power coupling advantages of the "return-to-zero" digital techniques.

Briefly, the invention herein disclosed comprises a point-contact type (PNP) transistor operating as a flip-flop circuit capable of being triggered into one state or the other by trigger signals applied to the emitter or base thereof, respectively, via appropriate respective differentiating and clipper circuits. The signal on the collector of this flip-flop transistor is conveyed to the base of a gating transistor which has a timing signal, in the form of a square wave, applied to its emitter and has its collector electrode output connected to a primary winding of a transformer. A pair of output gates are provided for gating signals from said timing signal source onto a pair of output leads. The control inputs to these gates are normally biased such that one gate is open and the other is closed. Signals generated on two oppositely wound secondary windings of the transformer are respectively applied to the control inputs of each of these two output gates, to thereby reverse their normal operating status, thereby gating timing signals from the timing signal source through the opposite output gate. Thus the output, in the form of square wave pulses, as obtained from either one or the other of these gates is governed by the application of trigger signals to one or the other of the two inputs of the flip-flop transistor.

The foregoing objects, aspects, features, and advantages of the invention as well as a more complete understanding thereof may be obtained by referring to the ensuing detailed description of the drawings in which.

Figure 1:
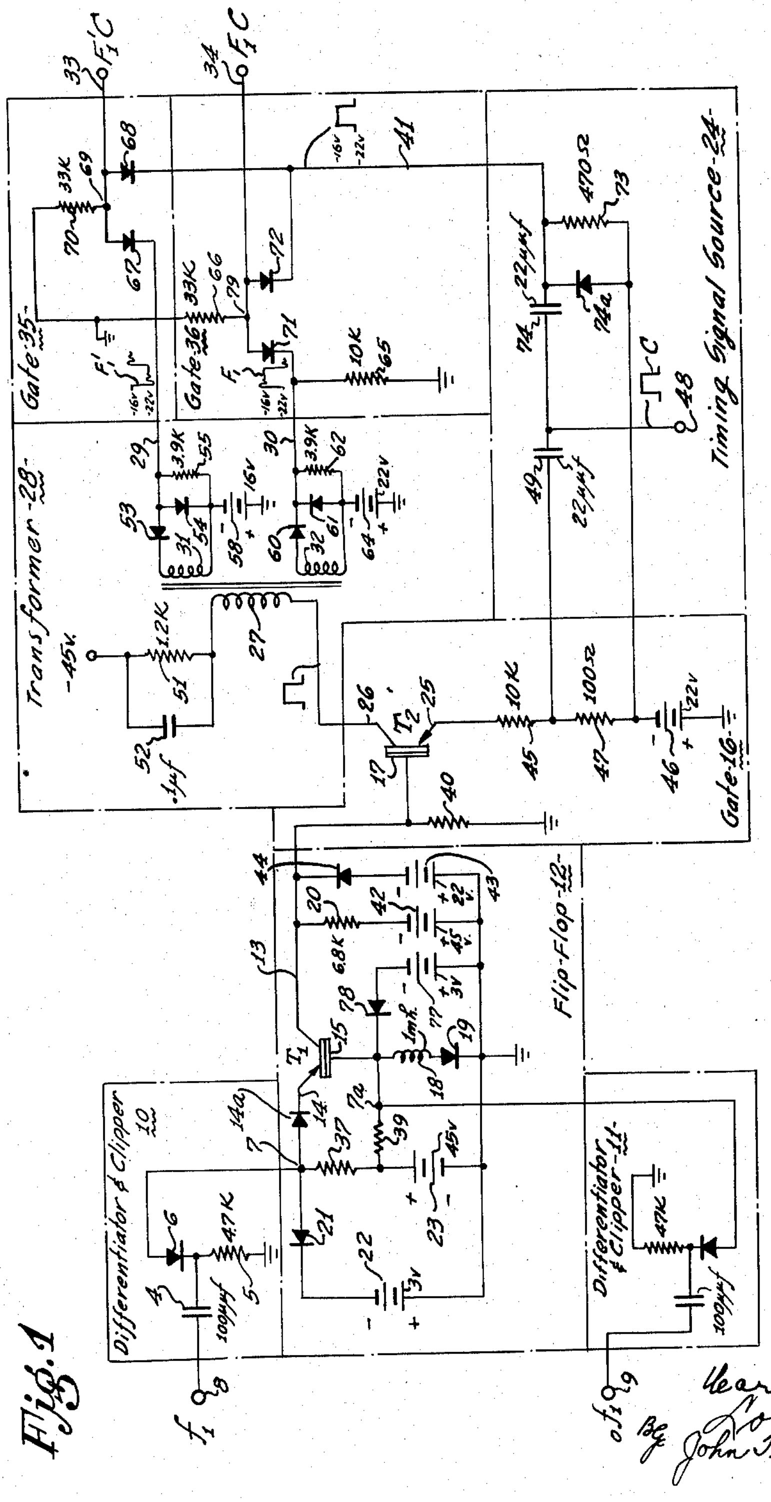
Fig. 1 is a schematic diagram of the invention.

Referring to the schematic diagram of Fig. 1, the preferred embodiment of the present invention will now be broadly described. The circuit includes a flip-flop circuit arrangement 12 comprised of a transistor $T_1$ having a collector 13 which can have either a high or a low level signal thereon. If transistor $T_1$ is triggered by a signal on trigger input 8, which is connected by way of differentiator and clipper circuit 10 to the emitter input junction 7, the signal on collector 13 is low. On the other hand, if transistor $T_1$ is triggered by a signal on trigger input 9, which is connected by way of differentiator and clipper circuit 11 to the base input junction *7a*, the signal on collector 13 is high. The collector 13 of transistor $T_1$ is connected to the base 17 of a transistor $T_2$ arranged to function as gate 16. A timing signal source 24 supplies emitter 25 of gate transistor $T_2$ with clock signals C, which pulses are connected by way of collector 26 to the primary winding 27 of transformer 28 when base 17 is at a low potential, i. e., when gate 16 is effectively open. Output lines 29 and 30 taken from the two oppositely wound secondary windings 31 and 32 of transformer 28 convey signals to input diodes 67 and 71 of the diode gates 35 and 36, respectively. A line 41 from timing signal source 24 supplies clock signals C to the other input diodes 68 and 72 of gates 35 and 36, respectively. As will be described hereinafter, gates 35 and 36 function to gate clock signals C from timing signal source 24 onto either output lead 33 or onto output lead 34 depending on whether flip-flop transistor $T_1$ is triggered by a signal on trigger input 9 or trigger input 8.

It should be understood that the transistor flip-flop 12 operates in the "non-return-to-zero" system. In such systems the signal on the collector output remains at a low or high voltage operating level for the duration of the several timing signal periods that the binary information does not change. On the other hand, the gated output information is represented in the "return-to-zero" system, i. e., binary information is represented on the output leads 33 and 34 by signals which return from a high to a low voltage operating level during each timing signal period. Thus in the preferred embodiment of the invention, for the duration of the timing signal periods that the flip-flop transistor $T_1$ is in its high or low conducting state, binary information signals appear as discrete pulses during each timing signal period on one of the output leads 33 or 34; while the other output lead is maintained at the low voltage operating level.

Referring to the circuitry of Fig. 1 in greater detail, differentiator and clipper circuit 10 includes capacitor 4 which, together with grounded resistor 5, serves to differentiate square wave pulses applied to input 8. A diode 6 then serves to pass only the negative portion of the differentiated pulse to emitter junction 7 of an input circuit connected to the emitter of transistor $T_1$. A differentiator and clipper circuit 11 is similarly arranged to enable only negative portions of differentiated pulses derived from square wave pulses applied on input 9 to be sensed on base junction *7a* of transistor $T_1$.

Transistor $T_1$, which is of the point-contact type, has the base thereof grounded by way of inductor 18 and a diode 19. The emitter input circuit includes a 45 volt clamping battery 23, the negative end of which is connected to ground and the positive end of which is connected to junction 7 by way of resistor 37. Junction 7 is further connected to ground by way of diode 21 and the negative terminal of a 3 volt bias battery 22.

The collector 13 of flip-flop transistor $T_1$ is connected by way of load resistor 20 to the −45 volt potential of battery 42. Collector 13 is clamped by diode 44 at −22 volts by battery 43.

The collector 13 from flip-flop transistor $T_1$ is connected to the base 17 of transistor $T_2$ which is grounded by resistor 40. The emitter 25 of transistor $T_2$ is connected by way of resistors 45 and 47 to the negative terminal of a 22 volt battery 46, the positive terminal of which is grounded. Signals applied on terminal 48 of timing signal source 24 are sensed on the emitter 25 of gating transistor $T_2$ by way of coupling capacitor 49 connected to the junction of resistors 45 and 47. The collector 26 from gating transistor $T_2$ is connected to one end of primary winding 27 of transformer 28. Transformer 28 has the other end of its primary winding 27 connected to a −45 v. D. C. bias voltage by way of limiting resistor 51, shunted by by-pass capacitor 52. Transformer 28 has a secondary winding 32 which is wound in the same sense as primary winding 27, and a secondary winding 31 which is wound in the opposite sense of primary winding 27. Secondary winding 31 is connected to a circuit loop comprised of diode 53 in series with the parallel combination of diode 54 and resistor 55. This loop is connected to a bias voltage of −16 volts supplied by battery 58. Secondary winding 32 is similarly connected to a circuit loop comprised of diode 60 in series with the parallel combination of diode 61 and resistor 62. This loop is connected to a bias voltage of −22 volts supplied by battery 64.

Secondary windings 31 and 32 are connected to diode gates 35 and 36, respectively. Output line 29 connects winding 31 to the cathode of diode 67 of gate 35; and output line 30 connects winding 32 to the cathode of diode 71. A line 41 is connected to the cathode of diode 68 of gate 35, and the cathode of diode 72 of gate 36. This line 41 is coupled by way of capacitor 74 to terminal 48 and is clamped at the −22 volts of battery 46 by clamping diode 74a shunted by resistor 73. In gate 35, the anodes of diodes 67 and 68 are connected to junction 69 which is connected, in turn, to ground by way of a load resistor 70. Gate 36 is similarly arranged with its load resistor 66 returned to ground.

Figure 3:
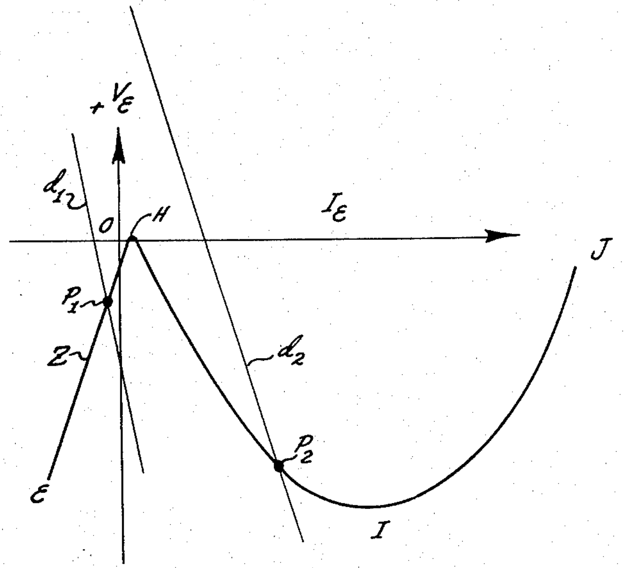
Fig. 3 is an emitter current versus emitter voltage graph, useful in explaining the operation of the transistor flip-flop circuit shown in Fig. 1.

The operation of flip-flop transistor $T_1$ is based upon the negative resistance characteristics of the point-contact type transistor. This inherent property of the point-contact type transistor will be better understood by reference to Fig. 3, showing a graph of emitter voltage $V_E$ versus emitter current $I_E$ for a grounded base circuit configuration. This impedance curve Z can be divided into three regions. Region EH, called cutoff, indicates but a small emitter current excursion for a rather large emitter voltage change. This region EH of the impedance curve Z represents a positive resistance characteristic of the circuit. In region HI, the negative resistance region, the voltage change is reversed with respect to the direction of emitter current change. The third region IJ, one of positive resistance, is characterized by the fact that on the lower part of the curve a large increase in emitter current causes only a small change in emitter voltage; this region is commonly referred to as "saturation."

In accordance with the magnitude of certain components, a load line can be drawn to intersect curve Z. It is to be noted that the prior art teaches that if the emitter circuit load line intersects the dynamic current-voltage characteristic curve of a point-contact type transistor at the proper points, a "flip-flop" or bistable state circuit is attained with but a single transistor element being utilized.

The slope of the load line can be changed by altering the magnitude of the resistors which determine it. In the inventive combination herein disclosed, this load line switching operation is conveniently combined with circuit triggering as will next be explained.

Figure 2:
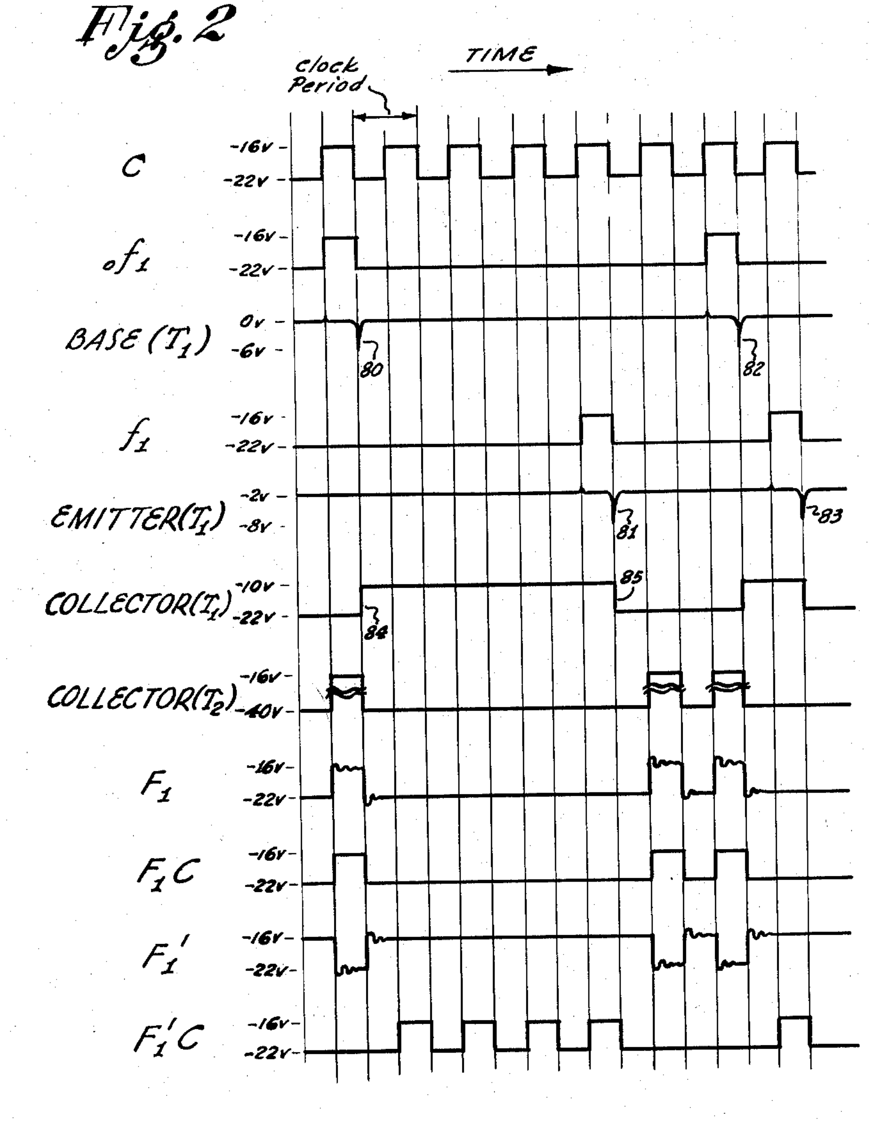
Fig. 2 is a graph of typical waveforms useful in explaining the operation of the invention.

Flip-flop transistor $T_1$ has two stable current states, i. e., the current on collector output 13 can be high or low (see Fig. 2). The circuit can be triggered from one stable state to the other by the application of an appropriate pulse to the emitter 14 or to the base 15 thereof.

For purposes of explanation, assume that the collector 13 of flip-flop transistor $T_1$ (Fig. 1) is initially in a relatively low current state. Under this condition, transistor $T_1$ is effectively nonconductive, i. e., the emitter 14 is now biased in a relatively large reverse direction with respect to the base 15. The circuit is now operating on a load line $d_1$, the slope of which is determined largely by the forward resistance of diode 21, and the relatively high back resistance of diode **14*a*. The point of intersection $P_1$ of load line $d_1$ with impedance curve Z determines the relatively low current state. The curve Z is clamped at peak H (ground) by means of the grounded diode 19 in the circuit loop which also includes battery 23 and resistor 39 therein. The voltage at junction 7 is dependent largely on negative potential supplied by the 3 volt battery 22, whereas the voltage at junction 7*a* is practically at ground. The collector 13, which is connected by load resistor 20 to the negative terminal of 45 volt battery 42, is clamped at —22 volts by diode 44 and battery 43. This arrangement helps to provide a relatively low output impedance at the collector 13** by decreasing the loading effect of transistor $T_2$.

When the negative portion of the differentiated pulse is applied to junction **7*a*, the base potential of transistor $T_1$ is lowered thereby; consequently the current of emitter 14 increases and the operational point of the circuit passes over hump H into the negative resistance region H1 of the curve of Fig. 3. As the emitter current becomes greater than zero, the biasing current therefor is exceeded by the positive base current. A current reversal now occurs in diodes 21 and 14*a*. As the emitter 14 becomes more negative, current now passes through the low forward resistance of diode 14*a* and the relatively high back resistance of diode 21. The circuit load line thus begins to shift. During this transition, inductor 18 tends to resist a change in current therethrough, i. e., acts as a high impedance. However, owing to the normal direction of current in the various electrodes, the resulting voltage drop across inductor 18 will be series-aiding with the emitter voltage and hence provide regenerative feedback. It is this feedback which effects negative resistance slope in region H1 of the impedance curve Z in Fig. 3. Thus more and more emitter current is effected and, as a result, even a greater amount of current appears on collector 13** until a quiescent state is attained as determined by the point of intersection $P_2$ of shifted load line $d_2$ with curve Z.

A relatively high current now exists on the collector 13 and also on load resistor 20. Diode 44, however, now presents a high impedance to current therethrough. It is to be noted that the clamp for valley point I (Fig. 3) is provided by the current loop including battery 77, diode 78, inductor 18, and diode 19.

In order to trigger the transistor $T_1$ flip-flop circuit back to its low current collector state, a trigger pulse must subsequently be applied to emitter junction 7. The effect of this pulse is to make the emitter voltage more negative, thus decreasing the emitter current and effecting a traverse of impedance curve Z back into cut-off region EH while the circuit operational point is simultaneously switched from $P_2$ back to $P_1$.

It should be noted that diodes 19 and 78 aid in clamping peak H and valley I, respectively, of impedance curve Z. If these diodes were omitted, current variations could produce appreciable voltage variations in the turning points of curve Z. Diode **14*a*** aids in achieving load line switching which improves triggering sensitivity for the flip-flop circuit.

Consider now how the collector current of flip-flop transistor $T_1$ is utilized to control the passage of clock pulses C through gating transistor $T_2$. Timing signal source 24 comprises a sequential train of clock pulses C (Fig. 2) applied to coupling capacitor 49 by way of terminal 48. Transistor $T_2$ has the base 17 thereof connected to the collector 13 of transistor $T_1$. The emitter 25 of transistor $T_2$ is connected to bias battery 46 by way of resistors 45 and 47 and the collector 26 of transistor $T_2$ is connected to the primary winding 27 of transformer 28. Transistor $T_2$ is "open," i. e., has relatively high collector current, when the collector current of transistor $T_1$ is low; whereas the gating transistor $T_2$ is "closed" when this current output is high.

When collector current from transistor $T_1$ is small, the base 17 of transistor $T_2$ is at essentially the same potential (—22 v.) as the emitter 25 thereof inasmuch as battery 46 and battery 43 are of the same value. Consequently a clock pulse applied to the emitter 25 of transistor $T_2$ is transmitted to the primary winding 27 of transformer 28 in the form of amplified current from the collector 26 of transistor $T_2$.

When the current of collector 13 of transistor $T_1$ is large, however, the base 17 of transistor $T_2$ is at a more positive potential than the emitter 25 thereof; consequently the current path through transistor $T_2$ is effectively blocked and no clock pulses are passed thereby to the primary winding 27 of transformer 28.

The collector 26 of transistor $T_2$ is connected to the primary winding 27 of transformer 28, and the other end of this primary winding 27 is connected to a suitable —45 volt D. C. source by way of current limiting resistor 51 which is shunted by a by-pass capacitor 52 in order to ensure that substantially all the A. C. signal is developed across the transformer secondary windings 31 and 32.

Secondary winding 31 is connected to pulse shaping diode 53 and has clamping diode 54 in series with clamping battery 58 shunted thereacross. Resistor 55 is representative of a load. Similarly, secondary winding 32 is connected to pulse shaping diode 60 and is shunted by clamping diode 61 having a clamp potential source 64 in series therewith. Resistor 62 is a load resistor. Grounded resistor 65 serves as a current path for gate 36 as will be discussed next.

Consider now the operation of gate circuits 35 and 36. Gate circuit 35 has the cathode equivalent end of its diode 68 normally maintained at the potential of battery 46 (—22 volts), while the cathode equivalent end of its diode 67 is normally maintained at the potential of battery 58 (—16 volts). The difference of potentials of batteries 46 and 58 render possible the unique operation of this gate 35. When gating transistor $T_2$ is effectively "open," i. e., the collector 13 of transistor $T_1$ has a relatively low current, a negative pulse generated on secondary winding 31 appears at the input to the cathode equivalent end of diode 67 simultaneous with a clock pulse C applied to the cathode equivalent end of diode 68. Under these conditions, no output pulse is generated on output lead 33 because the voltage at junction 69 of gate 35 falls to the lowest value as determined by the lower level of the negative pulse generated on output line 29 by secondary winding 31.

In the absence of any negative pulse from secondary winding 31, i. e., when transistor $T_2$ is effectively "closed," a clock pulse C is gated through gate 35 since a steady —16 volt signal from battery 58 is applied to the cathode equivalent end of diode 67 and the potential at junction 69 is thus enabled to rise and fall in accordance with clock pulse C applied to the cathode equivalent end of diode 68. Consequently an output pulse appears on output lead 33 in synchronization with a clock pulse C.

Gate 36 comprises the combination of diodes 71 and 72 connected to ground potential by way of resistor 66. The cathode equivalent ends of diodes 71 and 72 are connected to batteries 64 and 46, respectively, which are both of the same potential, e. g., −22 volts. Consequently an output pulse appears on output lead 34, only when a positive pulse from secondary winding 32 and a clock pulse C are applied simultaneously to the cathode equivalent ends of diodes 71 and 72, respectively, because the potential at junction 79 will then rise and fall in accordance with these two simultaneous input signals. This action takes place when gating transistor $T_2$ is effectively "open."

The operation of the circuit of Fig. 1 will now be further clarified by reference to the chart of waveforms in Fig. 2. It will be assumed that the circuit is initially operating with output pulses (hereinafter designated $F_1C$) appuearing on output lead 34, i. e., the collector 13 of transistor $T_1$ is initially in a low conducting current state (gate 16 is "open"), as shown by the waveform designated collector ($T_1$) in the graph of Fig. 2.

Consider first the effect of an appropriate signal applied to trigger input lead 9. In the graph of waveforms shown in Fig. 2, this signal is designated $_0f_1$. The effect of this signal is to trigger flip-flop transistor $T_1$, by virtue of the negative portion of the differentiated waveform 80, to a relatively high current condition, as evidenced by the positive swing 84 of the waveform designated collector ($T_1$) in Fig. 2. This relatively high current on collector ($T_1$) is conveyed to gating transistor $T_2$, effectively closing same, and consequently cutting off the flow of clock signals C from timing signal source 24 to the primary winding 27 of transformer 28. Under these conditions gate 35 is effectively open and, as shown in the chart, timed output signals $F_1'C$ pass therethrough to output lead 33. However, since gating transistor $T_2$ is now closed, no timed output signals $F_1C$ pass through diode gate 36 to output lead 34.

Consider next the effect of an appropriate signal $f_1$ applied to trigger input lead 8. The flip-flop transistor $T_1$ is now triggered by the negative signal 81 to a relatively low current condition as evidenced by the negative swing 85 in the waveform designated collector ($T_1$) in the graph. Gating transistor $T_2$ is now "open" to clock signals C received from timing signal source 24 since the emitter 25 and the base 17 thereof are at substantially the same potential. Consequently the primary winding 27 of transformer 28 is now energized by signals designated as collector ($T_2$) in Fig. 2. The two secondary windings 31 and 32 of transformer 28 now yield an output signal $F_1$ and an inverse output signal $F_1'$, respectively, as indicated in Fig. 2. The effect of output signal $F_1$ is to open gate 36 such that a clock pulse C being simultaneously received on line 41 is sensed an output lead 34 as a pulse $F_1C$. The inverse signal $F_1'$, however, prevents a clock signal C from passing through gate 35 to output lead 33.

This output condition, i. e., a train of signals $F_1C$ appearing on output lead 34, continues until an appropriate signal $_0f_1$ is subsequently again applied to input lead 9. The negative signal 82 obtained by differentiating signal $_0f_1$ switches the circuit to the condition in which an $F_1'C$ pulse appears on output lead 33. As shown in the graph, a signal $f_1$, applied on input lead 9 again reverses the state of the circuit at the end of the clock pulse period. Thus it has been described how a train of output signals can appear on one of two output leads, depending upon which of the two input leads last received an appropriate signal.

Figure 4:
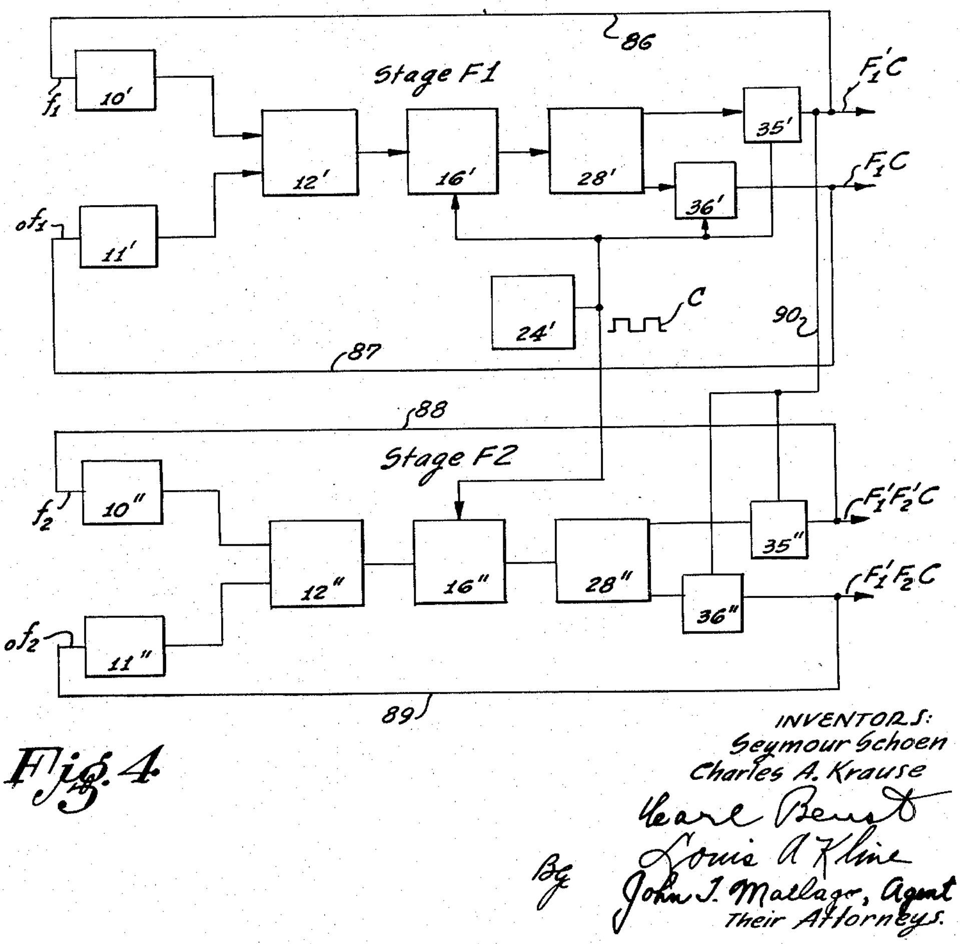
Fig. 4 is a block diagram of a frequency dividing circuit devised from a combination of two basic circuits presented in Fig. 1.

Fig. 4 is a block diagram showing how a pair of basic transistor computer circuits, designated as stages F1 and F2, can be used in combination so as to form a frequency divider circuit for clock signals C from a timing source. A circuit of this type is of utility in digital computors in such applications as pulse counters, or similar cyclical pulse indexing devices.

Inasmuch as circuit stage F1 and stage F2 are identical to the bistable state circuit shown in Fig. 1, like components thereof bear like numerical reference designations to those in the circuit of Fig. 1 with primes and double primes, respectively, affixed thereto. In this frequency divider circuit, the $F_1'C$ output of circuit stage F1 is fed back by way of line 86 to the $f_1$ trigger input thereof, while the $F_1C$ product output is fed back by way of lead 87 to the $_0f_1$ trigger input thereof. In a similar manner, the $F_1'F_2'C$ output of stage F2 is fed back by way of lead 88 to the $f_2$ trigger input thereof, while the $F_1'F_2C$ output is fed back by way of lead 89 to the $_0f_2$ trigger input.

Timing signal source 24' directs clock pulse signals C to gates 35' and 36' of stage F1 as well as to gate circuit 16' thereof. Timing signal source 24' also directs clock pulse signals C to gate circuit 16'' of stage F2. However, the signal inputs to the gates 35'' and 36'' of stage F2 are derived from the output $F_1'C$ of stage F1.

Figure 5:
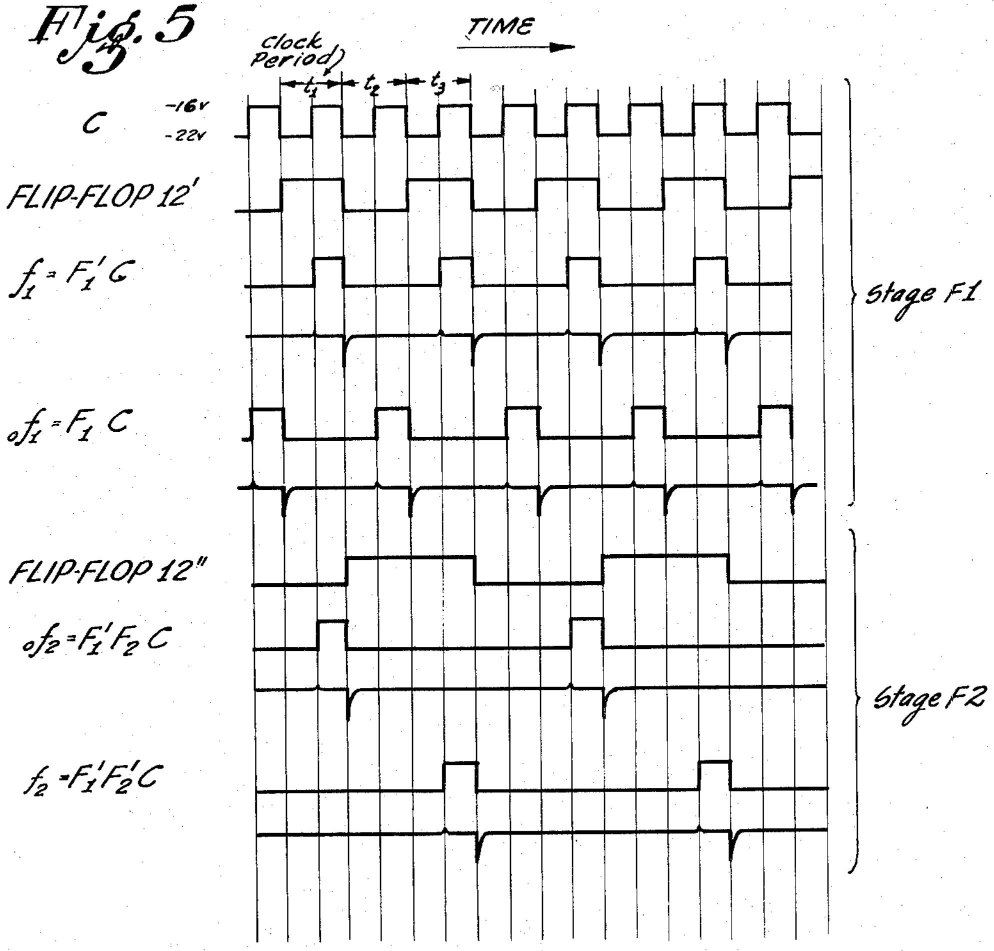
Fig. 5 is a graph of typical waveforms useful in explaining the operation of the frequency dividing circuit of Fig. 4.

In order to gain understanding of how the basic transistor circuit previously explained in Fig. 1 operates in this combination as a frequency divider circuit, reference will occasionally be made to Fig. 5 which is a representative plot of waveforms for the circuit shown in Fig. 4.

The signals energizing the frequency divider circuit originate in timing signal source 24'. Because of the arrangement whereby the outputs of stage F1 are connected to the trigger inputs thereof, timing signals C from signal source 24' will be, in effect, alternately sensed on outputs $F_1C$ and $F_1'C$. As shown in the graph of Fig. 5, whether a clock pulse C is sensed on output $F_1'C$ or $F_1C$ is dependent upon the high or low current output status of flip-flop 12'.

The flip-flop 12' is shown to be in a high current state during timing signal period $t_1$. This relatively high current effectively closes gate 16' and consequently cuts off the flow of clock pulses C from timing signal source 24' to the primary winding of transformer 28'. As a result, gate 35' is now open, permitting output signal $F_1'C$ to appear on the output lead. Signal $F_1'C$ is then fed back by way of lead 86 to the input $f_1$ of stage F1. The negative pulse generated at the end of timing signal period $t_1$, as a result of differentiating the pulse $f_1$, causes stage F1 to switch to a state characterized by flip-flop 12' being in a low conducting state. Thus during timing signal period $t_2$, gate 16' is open enabling a clock pulse C from timing signal source 24' to pass through to transformer 28'. This effectively opens output gate 36' so that the clock pulse C is effectively sensed as an output signal $F_1C$ which is fed back by way of lead 87 onto input $_0f_1$. The negative pulse generated at the end of timing signal period $t_2$ as a result of differentiating the pulse $_0f_1$ causes stage F1 to switch back to its original state characterized by flip-flop 12' being in a high conducting state.

The cycle of operation of stage F1 thus repeats as indicated by the waveforms for stage 1 shown in Fig. 5. Thus an output signal, scaled down by a factor of two from the clock signal frequency, is alternately available on outputs $F_1'C$ or $F_1C$, respectively, of stage F1.

Consider now the operation of stage F2 which in combination with that of stage F1 effects an output pulse rate that scales down the clock pulse rate from timing signal source 24' by a factor of four. In this circuit, signals from timing signal source 24' are applied only to the gate 16'' and the output signals $F_1'C$ from stage F1 are applied by way of common lead 90 as inputs to gates 35'' and 36'' of stage F2. Thus the gate 16'' has a steady rate sequence of clock pulses C applied thereto, while gates 35'' and 36'' each have a half-clock pulse rate input $F_1'C$ applied as one of the inputs thereto.

Flip-flop 12'' is initially shown to be in a low current conduction state and gate 16" is consequently open, causing a clock pulse C to be effectively sensed as output $F_1'F_2C$. This situation is represented in the group of waveforms for stage F2 of Fig. 5 during timing signal period $t_1$. This $F_1'F_2C$ pulse is fed back by way of lead 89 to the trigger input $_0f_2$ of stage F1. The effect thereof, at the end of timing signal period $t_1$, is to trigger flip-flop 12" to a relatively high current conduction state, thus closing gate 16".

Thus the next $F_1'C$ pulse, occurring during time interval $t_3$, for example, is effectively passed through gate 35" to generate an output pulse $F_1'F_2'C$. But this pulse $F_1'F_2'C$ is fed back by way of lead 88 to the trigger input $f_2$ of stage F2, causing flip-flop 12" to be triggered to a low state, at the end of timing signal period $t_3$. The operational cycle of stage F1 then repeats itself, as reference to the waveforms of Fig. 5 will reveal. Thus pulse outputs representing the clock pulse frequency scaled down by a factor of four are alternately available from stage F2 as signals $F_1'F_2C$ and $F_1'F_2'C$. It is thus obvious that additional stages, similar in circuitry to the circuit shown in Fig. 6, can be used to scale down the clock pulse rate still further, if so desired.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. A bistable state circuit arrangement comprising a transistor flip-flop circuit; a timing signal source; a pair of gating circuits, each having an input, an output, and a control lead, each said input lead responsive to signals from said timing signal source; and alternating current coupled means including switching means responsive to said flip-flop circuit and signals from said timing signal source to generate oppositely phased signals on said control leads for controlling said gating circuits, whereby timing signals from said source are sensed on the output of one or the other of said gating circuits dependent on the state of said flip-flop circuit.

2. A signal gating circuit arrangement comprising a source of timing signals; a transistor flip-flop circuit; a pair of gating circuits for gating signals from said timing source; control means including direct current potential sources for normally operating one of said gating circuits in an open condition and the other in a closed condition; and a second transistor controlled by the state of said flip-flop circuit to gate signals from said timing source for energizing said control means to produce signals for reversing the operating conditions of said gating circuits.

3. A bistable state circuit arrangement comprising a source of timing signals; a single pathed transistor flip-flop circuit capable of being triggered from one state to the other; an alternating current coupled driver circuit having a pair of outputs and a gated input responsive to timing signals from said source, said gated input controlled by the state of said flip-flop circuit; a pair of output gates, each having an input, an output, and a control lead; and means conditioned by the outputs of said driver circuit to provide oppositely phased signals on said control leads to thereby gate signals applied on said input leads from said timing source onto one or the other of said output leads.

4. A signal responsive transistor network comprising a timing signal source; a transistor flip-flop circuit having an output; a gating transistor having a base, an emitter, and a collector, the base thereof connected to the output of said flip-flop circuit, and the emitter thereof connected to said timing signal source; a transformer having a primary winding and a first and second secondary winding, the collector of said gating transistor being connected to said primary winding; a first gating circuit and a second gating circuit, each said gating circuit having one input thereto connected to a respective secondary winding and another input thereto connected to said timing signal source, and each gating circuit having an output lead, whereby signals are generated on either one of said output leads dependent on the state of said flip-flop circuit.

5. A signal responsive transistor network comprising a timing signal source; a transistor flip-flop circuit having an output; a gating transistor having a base, an emitter, and a collector, the base thereof connected to the output of said flip-flop circuit, and the emitter thereof connected to said timing signal source; a transformer having a primary winding and a pair of oppositely wound secondary windings, the collector of said gating transistor being connected to said primary winding; a first gating circuit and a second gating circuit, each said gating circuit having one input thereto connected to a respective secondary winding and another input thereto connected to said timing signal source, and each said gating circuit having an output lead; and bias means connected to said secondary windings to control said gating circuits in accordance with the response of said transformer to signals from said timing signal source, whereby signals are generated on either one of said output leads dependent on the state of said flip-flop circuit.

6. In combination, a double input transistor flip-flop circuit having an output lead; a timing signal source; a transformer having a primary winding and a first and second secondary winding; a gating transistor having a base, an emitter, and a collector, the base thereof connected to the output lead from said flip-flop circuit, the emitter thereof connected to said timing signal source, and the collector thereof connected to the primary winding of said transformer; a first gate circuit and a second gate circuit; an output lead from each secondary winding connected to a respective one of said gate circuits; and an input to each said gate circuit from said timing signal source, whereby upon application of a trigger signal to one input of said flip-flop circuit, timing signals are gated out of one of said gate circuits, and upon the application of a trigger signal to the other input of said flip-flop circuit, timing signals are gated out of the other of said gate circuits.

7. A bistable state circuit arrangement comprising a first and second differentiating circuit; a transistor flip-flop circuit having a base, an emitter, and a collector, said first differentiating circuit providing input signals to the base of, and said second differentiating circuit providing input signals to the emtter of, said transistor flip-flop; a source of square wave signals; a gating transistor having a base, an emitter, and a collector, the base of said gating transistor connected to the collector of said flip-flop circuit and the emitter of which is connected to said source; a transformer including a primary and two secondary windings, the collector output from said gating transistor being connected to the primary winding of said transformer; a pair of gating circuits, each of said gating circuits connected to the output of one of said secondary windings and each connected to said source; and an output lead from each said gating circuit, whereby signals from said source are sensed on either one of said output leads dependent on the application of a square wave signal on one or the other of said differentiating circuits.

8. A bistable state circuit arrangement comprising a first and second differentiating circuit; a transistor flip-flop circuit having a base, an emitter, and a collector, said first differentiating circuit providing input signals to the base and said second differentiating circuit providing input signals to the emitter of said transistor flip-flop; a source of square wave signals; a gating transistor having a base, an emitter, and a collector, the base of which is connected to the collector of said flip-flop circuit and the emitter of which is connected to said source; a transformer including a primary and two secondary windings, the collector of said gating transistor being connected to the primary winding of said transformer; a pair of gating circuits, each said gating circuits connected to the output of one of said secondary windings and each said gating circuit connected to said source; control means for biasing the outputs of said secondary windings such that one said gating circuit is open in the absence of signals on said transformer from said source and the other gating circuit is open upon receipt of signals on said transformer from said source; and an output lead from each said gating circuit, whereby signals from said source are sensed on either one of said output leads dependent on the application of a square wave signal on one or the other of said differentiating circuits.

9. A signal responsive network comprising a timing signal source; a flip-flop circuit; a transformer having a primary winding and a first and second secondary winding; gating means controlled by the state of said flip-flop circuit to pass signals from said timing signal source onto the primary winding of said transformer; a first gating circuit and a second gating circuit, each said gating circuit having one input thereto connected to a respective secondary winding of said transformer and another input thereto connected to said timing signal source; an output lead associated with each said gating circuit; and direct current control means for biasing the respective outputs from said secondary windings such that one said gating circuit is open in the absence of signals being gated to the primary winding of said transformer from said timing signal source and the other said gating circuit is open when signals are gated to the primary winding of said transformer from said timing signal source, whereby signals are generated on either said output lead dependent upon the state of said flip-flop circuit.

10. A signal responsive network comprising a timing signal source; a transformer having a primary winding and a first and second secondary winding; gating means to pass signals from said timing signal source onto the primary winding of said transformer; a first gating circuit and a second gating circuit, each said gating circuit having one input thereto connected to a respective secondary winding of said transformer and another input thereto connected to said timing signal source; an output lead associated with each said gating circuit; and direct current control means for biasing the respective outputs from said secondary windings such that one said gating circuit is open in the absence of signals being gated to the primary winding of said transformer from said timing signal source and the other said gating circuit is open when signals are gated to the primary winding of said transformer from said timing signal source, whereby signals are generated on either said output lead.

11. A bistable transistor circuit arrangement comprising: a source of periodically recurring square wave signals varying between a high and low voltage level; a transistor flip-flop having an output; a gating transistor having a base, an emitter, and a collector, the base thereof connected to the output of said flip-flop circuit and the emitter connected to said signal source; a transformer having a primary winding and first and second oppositely wound secondary windings, the collector of said gating transistor connected to said primary winding; a first diode gating circuit and a second diode gating circuit, each said gating circuit having one input thereto connected to said signal source; a first diode clamping circuit including a source of high level voltage connecting said first secondary winding to another input of said first gating circuit; a second diode clamping circuit including a source of low level voltage connecting said second secondary winding to another input of said second gating circuit; and an output lead for each said gating circuits.

References Cited in the file of this patent

UNITED STATES PATENTS

| | | |
|---|---|---|
| 2,619,594 | Goldberg | Nov. 25, 1952 |
| 2,644,896 | Lo | July 7, 1953 |
| 2,698,382 | Uglow et al. | Dec. 28, 1954 |
| 2,706,811 | Steele | Apr. 19, 1955 |

UNITED STATES PATENT OFFICE

CERTIFICATE OF CORRECTION

February 10, 1959

Patent No. 2,873,384

Seymour Schoen et al.

It is hereby certified that error appears in the printed specification of the above numbered patent requiring correction and that the said Letters Patent should read as corrected below.

Column 4, line 48, for "the =22 volts" read -- the -22 volts --; line 57, for column 7, line 21, for "appuearing" read -- appearing --; line 57, for "an output" read -- on output --; column 10, line 2, after "each" insert -- said --.

Signed and sealed this 16th day of June 1959.

(SEAL)
Attest:

KARL H. AXLINE
Attesting Officer

ROBERT C. WATSON
Commissioner of Patents